(12) United States Patent
Filsfils et al.

(10) Patent No.: US 9,479,403 B2
(45) Date of Patent: Oct. 25, 2016

(54) NETWORK AVAILABILITY ANALYTICS

(71) Applicant: CISCO TECHNOLOGY, INC., San Jose, CA (US)

(72) Inventors: Clarence Filsfils, Brussels (BE); David Ward, Los Gatos, CA (US); Christopher Y. Metz, Danville, CA (US); Peter De Vriendt, Denderleeuw (BE)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 13/780,253

(22) Filed: Feb. 28, 2013

(65) Prior Publication Data

US 2013/0265894 A1    Oct. 10, 2013

Related U.S. Application Data

(60) Provisional application No. 61/621,811, filed on Apr. 9, 2012.

(51) Int. Cl.
*H04L 12/26* (2006.01)
*H04L 12/721* (2013.01)
*H04L 12/24* (2006.01)

(52) U.S. Cl.
CPC ............... *H04L 43/00* (2013.01); *H04L 41/00* (2013.01); *H04L 43/04* (2013.01); *H04L 43/08* (2013.01); *H04L 43/0805* (2013.01); *H04L 45/70* (2013.01); *H04L 41/0681* (2013.01)

(58) Field of Classification Search
None
See application file for complete search history.

(56) References Cited

U.S. PATENT DOCUMENTS

| | | | |
|---|---|---|---|
| 6,385,201 B1 * | 5/2002 | Iwata | 370/400 |
| 7,002,960 B1 | 2/2006 | Golan et al. | |
| 7,027,396 B1 | 4/2006 | Golan et al. | |
| 7,743,139 B1 | 6/2010 | Golan et al. | |
| 7,898,973 B2 | 3/2011 | Filsfils et al. | |
| 2004/0190441 A1 * | 9/2004 | Alfakih | H04L 41/0668 370/216 |
| 2006/0007863 A1 * | 1/2006 | Naghian | H04L 45/121 370/238 |
| 2006/0171331 A1 * | 8/2006 | Previdi | H04L 45/26 370/254 |
| 2007/0081474 A1 * | 4/2007 | Sasaki | 370/254 |
| 2008/0165685 A1 * | 7/2008 | Weiss et al. | 370/231 |
| 2008/0298265 A1 * | 12/2008 | Filsfils | H04L 43/0852 370/252 |
| 2010/0124180 A1 * | 5/2010 | Benkis | H04L 12/2602 370/252 |
| 2010/0296474 A1 * | 11/2010 | Noriega | H04L 47/10 370/329 |

FOREIGN PATENT DOCUMENTS

WO    WO/2006/130830    8/2007

OTHER PUBLICATIONS

IETF Internet Draft "Advertising Link-State Information in BGP" draft-gredler-bgp-te-01, H. Gredler, Jul. 11, 2011.

(Continued)

*Primary Examiner* — Chirag Shah
*Assistant Examiner* — Amar Persaud
(74) *Attorney, Agent, or Firm* — Cindy Kaplan

(57) ABSTRACT

In one embodiment, a method includes receiving at a network device, route convergence measurements and traffic demand measurements from a plurality of routers, and computing network availability based on the measurements at the network device. The route convergence measurements are associated with route computations at the routers and the traffic demand measurements include portions of a demand matrix associated with the routers. An apparatus and logic are also disclosed herein.

20 Claims, 5 Drawing Sheets

(56) References Cited

OTHER PUBLICATIONS

IETF RFC 3107, "Carrying Label Information in BGP-4", Y. Rekhter et al., May 2001.
Myakotnykh E S et al:"Analyzing causes of failures in the Global Research Network using active measurements",ICUMT,Oct. 18, 2010, ISBN:978-1-4244-7285-7.
Poretsky Allot Communications B Imhoff Juniper Networks K Michielsen Cisco Systems S: Benchmarking Methodology for Link-State IGP Data-Plane Route Convergence,Nov. 22, 2011.
IETF RFC 6413, Poretsky Allot, et al., "Benchmarking Methodolofy for Link-State IGP Data-Plane Route Covnergence", Nov. 22, 2011.
H. Gredler et al., "Advertising Link-State Information in BGP", Jul. 11, 2011.

* cited by examiner

NETWORK AVAILABILITY ANALYTICS

STATEMENT OF RELATED APPLICATION

The present application claims priority from U.S. Provisional Application No. 61/621,811, entitled NETWORK AVAILABILITY ANALYTICS, filed on Apr. 9, 2012. The contents of this provisional application are incorporated herein by reference in its entirety.

TECHNICAL FIELD

The present disclosure relates generally to communication networks, and more particularly, to network availability measurements and computations.

BACKGROUND

Network availability is becoming increasingly important for networks such as those offering advanced services. A highly available network is needed to meet quality goals, provide a competitive service, and minimize ongoing operating expenses. In conventional networks, measurement of network convergence and availability often involves injecting probes throughout the network. Such techniques do not scale well and suffer from accuracy and completeness issues.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
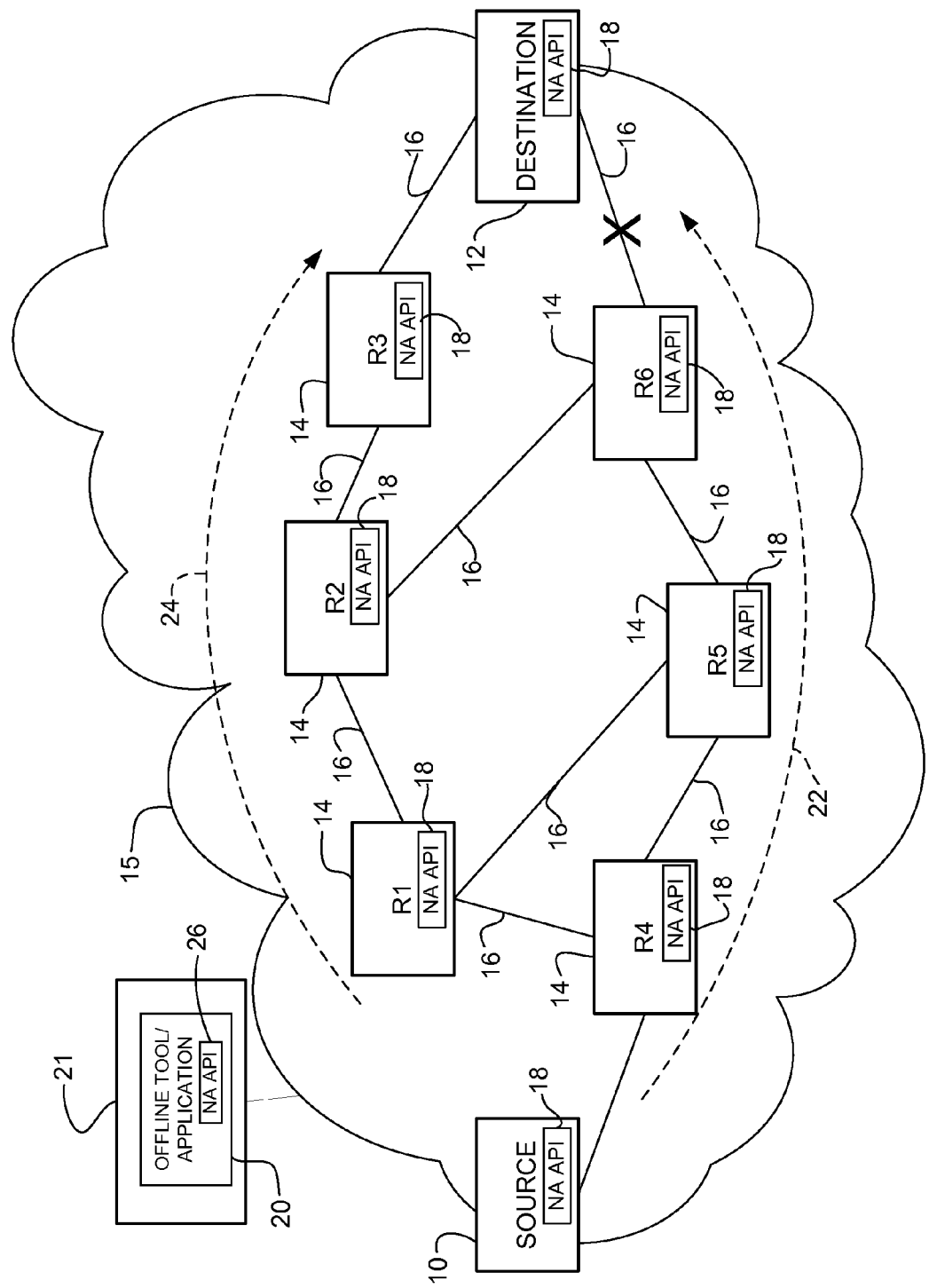
FIG. 1 illustrates an example of a network in which embodiments described herein may be implemented.

In one embodiment, a method generally comprises receiving at a network device, route convergence measurements and traffic demand measurements from a plurality of routers, and computing network availability based on the measurements. The route convergence measurements are associated with route computations at the router and the traffic demand measurements comprise portions of a demand matrix associated with the routers.

In another embodiment, an apparatus generally comprises a processor for generating at a router, route convergence measurements and traffic demand measurements, memory for storing the route convergence measurements and traffic demand measurements, and an application programming interface for providing the route convergence measurements and the traffic demand measurements to a network device operable to collect a plurality of the route convergence and traffic demand measurements from a plurality of routers in a network and compute network availability based on the measurements.

In yet another embodiment, logic is encoded on one or more tangible computer readable media for execution and when executed operable to generate route convergence measurements and provide the route convergence measurements to a network device operable to collect a plurality of the route convergence measurements and traffic demand measurements from a plurality of routers in a network and compute network availability based on the measurements. The route convergence measurements are associated with route computations at the routers and the demand measurements comprise portions of a demand matrix associated with the routers.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

High network availability and faster convergence requirements have resulted in a need for monitoring and assessment of network performance. Difficulties in monitoring network convergence arise due to large network size, smallness of measured parameters, non-predictability of convergence events, and level of details needed to correctly assess convergence performance. Conventional systems often inject probes through the network to measure key metrics. However, this technique does not scale well and suffers from accuracy issues. For example, not enough probes may be provided to measure at a millisecond timescale. There are also completeness issues since probes cannot be sent on all of the possible paths through the network. Another drawback is that probes may simply report a problem without the ability to identify its location or provide details needed to analyze the cause of the problem. Moreover, applications needing network availability information would have to interface with multiple systems, which may not even provide the data needed to properly compute network availability.

The embodiments described herein utilize route convergence and traffic demand measurements provided by routers to compute network availability. As described in detail below, an offline tool (application) may be used to gather route convergence and traffic demand measurements. In one embodiment, the information is provided via an application programming interface (API). A network availability API may be used to abstract network availability information from one or more sources in the network. Operational statistics that were not previously available with conventional systems are provided in a clearly organized database with well-defined APIs to allow for third party application development. For example, a network availability API may allow other applications to register their interest for the availability data for specified locations (e.g., specific customer ports or destinations) or services. This allows various applications to be informed of the availability of network services and take any necessary measure to improve it. The uniform programming interface facilitates the development and implementation of multiple applications that can take advantage of accurate network availability information.

Referring now to the drawings, and first to FIG. 1, an example of a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, or other network devices), which facilitate passage of data within the network.

Network 15 shown in the example of FIG. 1 includes a source 10, destination 12, and plurality of routers 14 (R1, R2, R3, R4, R5, R6) connected by links 16. The routers 14 may be any network device (e.g., router, switch/router) configured to perform routing functions. The routers 14 may route traffic including, for example, unicast or multicast data. The routers 14 may be located, for example, in a service provider network, or any other network. The source and destination nodes 10, 12 may be edge routers, or any other network device. In one embodiment, a Network Availability (NA) API 18 is located at one or more of the routers. In the example shown in FIG. 1, each router 10, 12, 14 is configured for network availability analytics (NAA); however, there may be one or more routers in the network that are not configured for NAA.

An offline planning tool (OT) 20 may be located at a network device 21 (management station, server, or other network device) in the same network as the routers or another network. The offline tool 20 may also be distributed among two or more network devices. As described below with respect to FIG. 4, the offline tool 20 may comprise a network availability analytics application or other application located at the network device 21. The offline tool 20 uses route convergence and traffic demand measurements in network availability computations. Network availability computations may be used, for example, to identify network convergence and network availability in an operational network in an end-to-end manner, for any flow, at an accuracy of a few milliseconds.

In one embodiment, the network availability is calculated using route convergence monitoring and diagnostics (RCMD) and distributed demand matrix (DDM) data. Examples of collection and computation of RCMD and DDM data are described further below. In one example, network availability is computed based on the amount of traffic lost due to all routing convergence events and the amount of traffic ingressing the network over a specified period of time. An example of a routing convergence event is described below with respect to FIG. 1.

In the example shown in FIG. 1, prior to a network failure, packets (e.g., traffic or subset of traffic from source 10 to destination 12) follow a first path 22. At time T0, a link failure occurs between router R6 and the destination 12. One or more of the routers 14 in the network identifies the link failure and notifies the rerouting router (or routers) of the failure at time T1. At time T2 the network converges and all traffic reaches the destination 12. End-to-end network convergence refers to the time it takes for all routers in the network to adapt to a change in topology. In one example, router R4 reroutes traffic from path 22 onto path 24. In this example, the loss of connectivity for demand (S, D) ends as soon as a router 14 within the topology reroutes traffic from path 22 onto path 24.

As shown in the example of FIG. 1, the network 15 may include any number of alternate paths for transmitting data from source 10 to destination 12. The network may converge upon one or more paths based on bandwidth or link costs, for example. As described in detail below, the offline tool 20 may use an iterative process to find when end-to-end paths become valid. The offline tool 20 may pick a specific event (e.g., failure of the link between router R6 and the destination 12) and a specific demand (e.g., traffic from source 10 to destination 12) and compute the end-to-end convergence for a flow from source to destination and hence derive the network availability for destination 12 as seen from source 10. The same process is then repeated for each demand for each event. The offline tool 20 may be used to periodically compute network availability, as described below.

It is to be understood that the network shown in FIG. 1 is only an example and that networks comprising a different number or type of network devices or topology may be used without departing from the scope of the embodiments.

Figure 2:
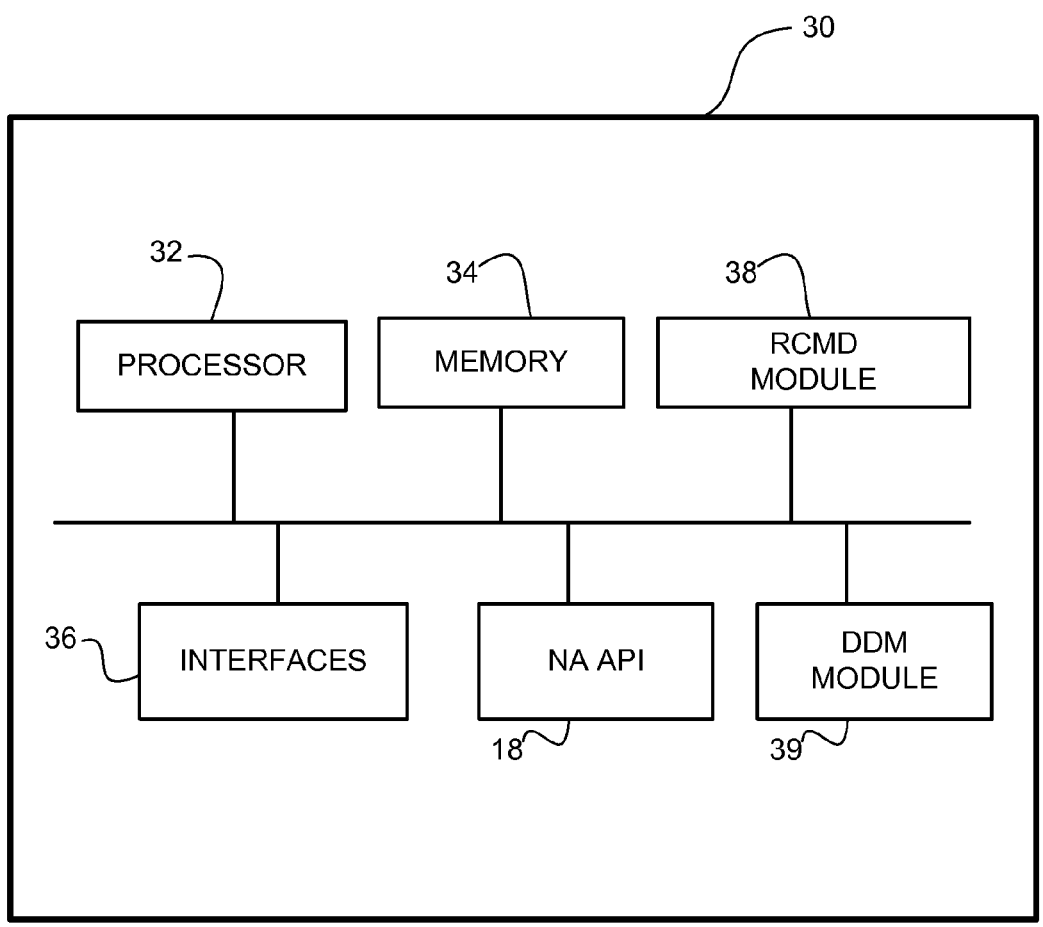
FIG. 2 depicts an example of a network device useful in implementing embodiments described herein.

FIG. 2 illustrates an example of a network device 30 (e.g., router) that may be used to implement the embodiments described herein. In one embodiment, the network device 30 is a programmable machine that may be implemented in hardware, software, or any combination thereof. The network device 30 includes one or more processor 32, memory 34, network interfaces 36, NA (Network Availability) API 18, RCMD module 38, and DDM module 39.

Memory 34 may be a volatile memory or non-volatile storage, which stores various applications, operating systems, modules, and data for execution and use by the processor 32. The NA API module 18, RCMD module 38, and DDM module 39 may include, for example, software or code stored in memory 34.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The network interfaces 36 may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

The network device 21 comprising offline tool 20 (FIG. 1) may also include a processor, memory, and network interfaces, as described above.

Figure 3:
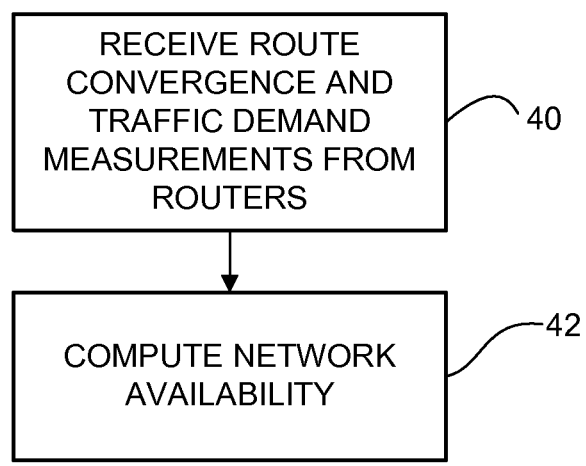
FIG. 3 is a flowchart illustrating an overview of a process for computation of network availability, in accordance with one embodiment.

FIG. 3 is a flowchart illustrating an overview of a process for computing network availability, in accordance with one embodiment. At step 40, a network device (e.g., network device 21 comprising offline tool/application 20 in FIG. 1) receives route convergence and traffic demand measurements from a plurality of routers (e.g., routers 10, 12, 14 in FIG. 1). The route convergence measurements are associated with route computations at the routers and the traffic demand measurements comprise portions of a demand matrix associated with the routers. Each of the routers configured to generate network availability data may provide route convergence measurements, traffic demand measurements, or both route convergence and traffic demand measurements. For example, if the router is not an edge device, it may only provide route convergence measurements. Also, some of the measurements may be collected at one or more of the routers and transmitted to the network device 21.

The network device 21 computes network availability at step 42. The network availability may include availability of network services, network convergence times, or any other network availability statistics. For example, the network device 21 may pick a specific event and demand and compute end-to-end convergence for a flow from source to destination and repeat this process for each demand for each event. The network device 21 may request network availability data for specific resources, services, or demands and compute network wide availability on a periodic basis.

Referring again to FIG. 1, the following example describes how the offline tool 20 computes an end-to-end convergence time for a flow from source 10 to destination 12 and derives the network availability for the destination as seen from the source.

The offline tool 20 sets T0 as the time when the link between router R6 and the destination 12 failed. As described below, this information may be obtained from route convergence measurements (e.g., RCMD data). The offline tool 20 sets Top1 as the topology just before T0. The shortest path from source 10 to destination 12 in the topology Top1 just before the failure is identified as SPT(SD, Top1). In this example, SPT(SD, Top1) is the path from source→R4→R5→R6→destination.

The loss of connectivity for demand [S, D] ends as soon as a router within SPT(SD, Top1) reroutes traffic destined for destination 12 (originally on route 1 (e.g., path 22)) onto a valid path (route 2 (e.g., path 24)). The offline tool 20 finds route 1 in the collected RCMD data. As soon as R4, R5, or R6 individually reroutes their path to the destination 12, an end-to-end path to the destination via the node is valid. This is because each of their respective neighbors uses a path to the destination that is independent from the status of the link between router R6 and the destination. For example, R1's path to the destination is R1→R2→R3→destination and R2's path to the destination is R2→R3→destination). In this case, the validity of the new path is straightforward.

The offline tool's verification of route 2 may require an iterative process. In one example, the link between router R3 and the destination has a cost of 30 and the other links have a cost of 8. In this case, the respective paths to the destination from R1 and R2 are R1→R5→R6→destination, and R2→R6→destination. It is no longer sufficient for R4 or R5 to reroute via R1, or R6 to reroute via R2. In this example, there would be an end-to-end convergence when [R4, R1, R2] have all converged, when [R5, R1, R2] have all converged, or when [R6, R2] have all converged. Thus, the offline tool's verification of the validity of the new path is a recursive process. The offline tool 20 needs to check whether or not the new path depends on the failed link. As long as there is a dependency, the offline tool needs to keep using the route convergence data to find when the related end-to-end path becomes valid. This process stops as soon as a neighbor has rerouted on a path to the destination that does not depend on the failed link.

The following describes a recursive process used to derive a network wide availability, in accordance with one embodiment. In one example, the offline tool 20 computes on a monthly basis (or another time period) the network availability as:

(Traffic−Loss)/Traffic;

wherein:
Loss=the amount of lost traffic due to all of the routing convergence events during the time period; and
Traffic=the amount of traffic ingressing the network over the time period.

On a per routing event, the offline tool 20 computes the Loss as the sum of lost traffic across all demands of the demand matrix collected during the event. On a per demand per routing event basis, the offline tool computes the lost traffic for the demand as:

demand*(convergence time for the destination of the demand)

The computation of convergence time for the destination of the demand is computed as described in the above example for computing end-to-end convergence.

When a node or SRLG (Shared Risk Link Group) fails, multiple elements of the topology change. The offline tool's computation process of the convergence time for a destination is extended to take into account all of these failures. The start of the convergence is defined as when a link on the path to the destination fails and the end of the convergence is when a router on that path reroutes onto a valid path, where the validity takes into account all of the failed elements of the node or SRLG event.

When a link, node, or SRLG comes up, loops (uloops) may occur. The offline tool 20 can leverage the route convergence and demand matrix measurements to compute how much loss occurred due to the loop.

There are multiple methods (e.g., SNMP (Simple Network Management Protocol), NetFlow, BGP (Border Gateway Protocol), XML (Extensible Markup Language), etc.) that may be used by an application to ask for and retrieve network data from the routers in the network. However, it is inefficient and complex for individual applications to choose and implement a specific method. It also makes porting of different applications (e.g., third party applications) to new platforms difficult and places an additional burden on the application developer who must be concerned with 'communicating' between the entities hosting their applications and the routers in the network.

In one embodiment, the Network Availability Application Programming Interface (NA API) is used to abstract one or more of the aforementioned methods into a programming interface that application developers can use to register their interest in network availability data, request network availability data for specific resources (e.g., prefixes in a topology), and to receive network availability data feeds from the routers in the network. The API also hides the methods for transporting the network availability data between the applications and the routers. An application developer need only comply with the semantics of the NA API.

The network devices may be configured to setup the collection of NA data automatically, without the need for input from external devices, so that the network device can provide network availability analytics data to a device requesting the data.

Figure 4:
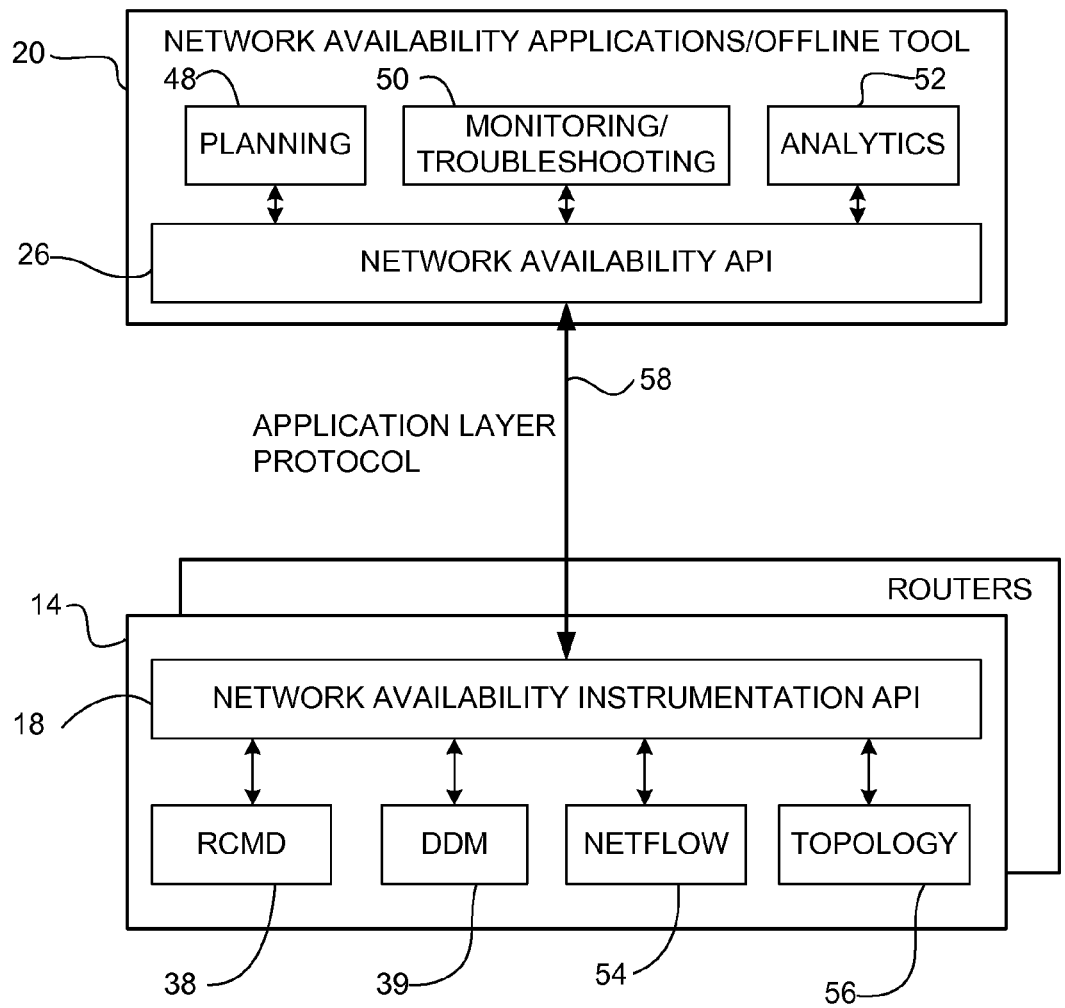
FIG. 4 is a block diagram illustrating components of a network availability application programming interface at an offline tool and routers in the network of FIG. 1, in accordance with one embodiment.

FIG. 4 is a block diagram illustrating an example of network availability instrumentation API 18 installed at the routers 14 in communication with network availability API 26 at offline tool 20. The NA API 18 may be installed at any number of routers 14 in the network. Also, each NA API 18 at the routers 14 may be in communication with any number of NA APIs 26. Any number of applications at the offline tool 20 may interact with any number of NA APIs 18 at the routers 14, thus enabling the applications to communicate with one or more routers for the purpose of requesting and receiving network availability information.

The NA API 18 may be used with third party applications that offer a standardized API, which allows other applications to register their interest for the availability state of some customer ports (e.g., all demands originating from a specified port of a specific edge router) or specified destinations or services. Through use of the NA API, applications are informed of the availability of the network service and can therefore take any necessary measure to improve the availability. Actions may include, for example, switching service provider or using other data centers to host a portion of their services. Service requests are met based on computation of network availability analytics described herein.

The uniform programming interface facilitates the development and implementation of multiple applications that can take advantage of accurate network availability information. For example, planning application 48 can periodically compute network wide availability and use that as one factor when engineering the optimal use of network resources or improved services. Monitoring and troubleshooting application 50 may use the network availability information to examine network availability (in near real-time or in playback mode) to pinpoint the root cause of a problem. Analytics application 52 may process multiple information feeds such as routing protocols, SNMP, NetFlow, and network availability data, and use the information to present a precise picture of the network health at different timescales. This rolled up view of network health aids the operator in managing the network and can be used to monetize its value.

It is to be understood that the applications 48, 50, 52 shown in FIG. 4 and described above are only examples, and that other applications may use the network availability information, without departing from the scope of the embodiments.

The network availability API 18 on the router 14 interacts with the one or more subsystems (e.g., RCMD module 38, DDM module 39, NetFlow data 54, topology data 56) configured to generate and collect network data. It is to be understood that these are only examples of data that may be monitored or collected and that other data (e.g., packet drops) may be used to provide an indication of network availability. An application layer protocol may be used to transport network availability information over link/path 58 as shown in FIG. 4.

Figure 5:
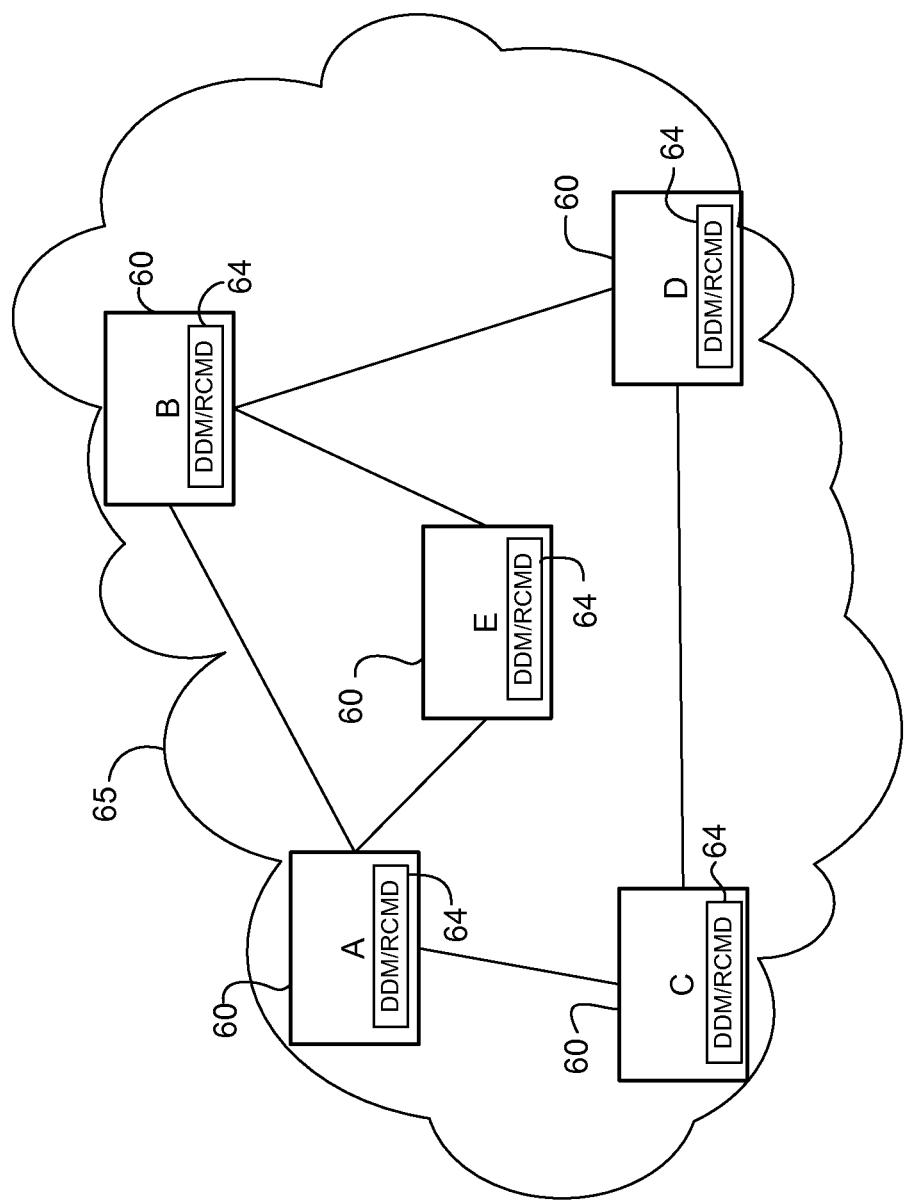
FIG. 5 illustrates another example of a network in which embodiments described herein may be implemented.

FIG. 5 illustrates an example of routers 60 comprising RCMD (Route Convergence Monitoring and Diagnostics) and DDM (Distributed Demand Matrix) components 64 for use in providing route convergence and traffic demand measurements. The example shown in FIG. 5 includes edge routers A, B, C, D, and core router E. The DDM/RCMD components 64 may include, for example, RCMD module 38, DDM module 39, or both RCMD and DDM modules.

In one embodiment, RCMD is implemented at routers 60 in network 65 to measure the convergence behavior of various routing protocols and extensions (e.g., ISIS (Intermediate System-to-Intermediate System), OSPF (Open Shortest Path First), BGP (Border Gateway Protocol), TE (Traffic Engineering), LDP (Label Distribution Protocol), LFA (Loop Free Alternate), PIM (Protocol Independent Multicast), mLDP (multicast Label Distribution Protocol)). RCMD is used to collect and report data related to routing convergences. RCMD provides an 'in-router' view of convergence events. Data can be exported (e.g., via XML (Extensible Markup Language)) and correlated and leveraged by the offline tool 20. RCMD can operate in a monitoring mode for detecting events and measuring convergence, and a diagnostics mode for additional debug information collection for abnormal events. RCMD identifies all of the reasons (i.e., triggers) that lead to a given routing table recomputation (route computation). This identification scheme allows for correlation across all route convergence measurements. In one embodiment, RCMD operates as described in U.S. patent application Ser. No. 13/758,501, filed Feb. 4, 2013, entitled "Route Convergence Monitoring and Diagnostics", the contents of which are incorporated herein by reference in its entirety.

RCMD may be used to measure the time it takes from a change in the network to the time for a router to adjust its hardware to the change (T2−T0). The embodiments may also be used to measure the time it takes for any router receiving the change information to make a change in its hardware such that the information is now used to forward packets (T2−T1). The time period (T2−T1) is significant in that many components are involved in operations at the router that lead to the change in hardware.

When a link goes down as shown in FIG. 1 and discussed above, the failure is detected at one of the routers and the detected failure is flooded throughout the network. A flooding measurement identifies the time between when the failure message originated at the detecting router and when it is received at the rerouting router (T1−T0). In one embodiment, a timestamp is used for marking time T0 when a change occurs (e.g., link down). The routers transmit route information (e.g., a link state packet (LSP) in ISIS or a link state announcement (LSA) in OSPF). The router adds the timestamp indicating the time (T0) that it originated the new route information. The rerouting router receives the information at T1 and updates its routing information.

An update measurement identifies the time between when the failure notification is received at the rerouting router (T1) and when a last important prefix is installed across all of its linecards (T2). In one embodiment, convergence time (T2-T1) at the router 14 is measured using markers. The markers are flags attached to internal routing information associated with topology information received from the network. The markers are tracked as the internal routing information propagates from one routing component to the next within software at the router. When any component receives a marker it saves a timestamp associated with that particular marker. The final component that modifies the hardware saves the timestamp, which is time T2. In order to provide scalability, only select routes are tracked. Routes may be selected based on a policy such as priority levels. The routing components thus act on a limited number of markers rather than each route that is processed. This greatly reduces the work required to track the routes through the routing components and the amount of tracking data that needs to be stored.

A measurement component in the system collects tracking information on the router and by comparing the saved timestamps (T0 and T2) it can find the end-to-end convergence. Problems local to the router may be identified by examining the time interval from T1 through T2.

RCMD may be used for ISIS and OSPF convergence measurement and to gather details about SPF (Shortest Path First) runs and time taken to provision routes and LDP (Label Distribution Protocol) labels across all linecards on the router. RCMD may also be used to provide information about LFA (Loop Free Alternate) coverage available at the end of each SPF run, and BGP (Border Gateway Protocol) and TE (Traffic Engineering) information. Since RCMD is used to monitor various routing convergence events, implementation is embedded within routing subsystem components, including for example, ISIS, OSPF, RIB (Routing Information Base), LDP, LSD (Label Switching Database), and FIB (Forwarding Information Base).

In one embodiment, the traffic demand measurements comprise the router's share of a demand matrix as described in U.S. patent application Ser. No. 13/752,926, filed Jan. 29, 2013, entitled "Distributed Demand Matrix Computations", which is incorporated herein by reference in its entirety. A demand represents traffic flowing between any two edge devices in the network. There may be any number of traffic flows across the network. A demand matrix (traffic matrix, traffic demand matrix) describes the aggregation of flows at the edge of the network. A demand is a single element (cell) of the demand matrix associated with a source and destination in the network. Each demand is thus a single entry in the demand matrix that identifies the amount of traffic that enters the network at one point and leaves the network at another point. For example, traffic may enter a network at router A and traverse the network along a path until it reaches router B, where it leaves the network. In order to construct the demand matrix, information is collected about all of the traffic and how it enters and exits the network. Traffic measurements are mapped to individual demands.

A demand matrix for four interconnected edge devices A, B, C, D as shown in FIG. 5 may be expressed as follows:

$$\begin{bmatrix} [AA\ AB\ AC\ AD] \\ [BA\ BB\ BC\ BD] \\ [CA\ CB\ CC\ CD] \\ [DA\ DB\ DC\ DD] \end{bmatrix}$$

Each row of the above demand matrix includes cells corresponding to traffic received at one of the edge devices. For example, the first row comprises cells corresponding to traffic received at router A that will egress the network at router A (AA), router B (AB), router C (AC), and router D (AD). Similarly, the second row comprises cells corresponding to traffic received at router B that will egress the network at router A (BA), router B (BB), router C (BC), and router D (BD), and the third and fourth rows comprise the cells corresponding to traffic entering the network at routers C and D, respectively. Each router computes its own row (local demands) for the demand matrix. The local demands (portions of the demand matrix) from each of the routers can be collected at one or more of the routers, or another device (e.g., offline tool 20) and the complete demand matrix generated.

One or more routers in the network may include DDM module 39 configured to compute all of the [X, Y] cells of the demand matrix, where X is the router at which the DDM module is located. The router further includes a demand database maintained by the DDM module. DDM measurements from each linecard are stored in the database for a specified time period. The demands in the database may be retrieved for use by capacity planning applications or other operational applications running on the offline tool 20. Demands from the database may also be advertised to other routers participating in the DDM process.

Each DDM module 39 is also configured for synchronized periodic measurement archive. For example, each database comprises a plurality of demands computed and stored for a time period. All of the time periods used at each edge device have a common multiple. This timing rule makes it possible to combine the distributed measurements of different routers and ensure that it is straightforward to recompose the different cells into matrices that relate to a specific time period. Also, while a router can operate at a fine periodicity (T=15 minutes) for the purpose of maintaining its local DDM database, it can send its BGP DDM updates at a lower frequency (e.g., every 60 minutes).

It is to be understood that the RCMD and DDM measurements described above are only examples of route convergence measurements and traffic demand measurements that may be used to compute network availability as described herein.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a network device, route convergence measurements and traffic demand measurements from a plurality of routers on multiple paths; and
   computing network availability at the network device based on said route convergence measurements and said traffic demand measurements;
   wherein said route convergence measurements are associated with route computations related to routing convergences at the routers and comprise measurement of convergence behavior of routing protocols at the routers for use in identifying convergence time for a router to adapt to a change in network topology, and said traffic demand measurements comprise demands corresponding to cells of a demand matrix associated with traffic at each of the routers; and
   wherein said network availability is computed for a specified period of time and for end-to-end convergence for a flow from a source to a destination.

2. The method of claim 1 wherein receiving said route convergence and traffic demand measurements comprises receiving said measurements at an application programming interface.

3. The method of claim 2 wherein said measurements are received for a specific location in the network.

4. The method of claim 2 wherein said measurements are received for a specified service.

5. The method of claim 2 further comprising identifying an interest in said measurements for a specific resource.

6. The method of claim 1 wherein the network availability is computed at a planning application.

7. The method of claim 1 wherein the network availability is used by a monitoring and troubleshooting application.

8. The method of claim 1 wherein the network availability is computed at an analytics application operable to process network availability and network flow data.

9. The method of claim 1 wherein said portions of the demand matrix associated with the routers are computed at the routers.

10. An apparatus comprising:
    a processor for generating at a router, route convergence measurements and traffic demand measurements;
    memory for storing said route convergence measurements and said traffic demand measurements; and
    an application programming interface for providing said route convergence measurements and said traffic demand measurements to a network device operable to collect a plurality of said route convergence measurements and said traffic demand measurements from a plurality of routers on multiple paths in a network and compute network availability based on said measurements;

wherein said route convergence measurements are associated with route computations related to routing convergences at the routers and comprise measurement of convergence behavior of routing protocols at the routers for use in identifying convergence time for a router to adapt to a change in network topology, and said traffic demand measurements comprise demands corresponding to cells of a demand matrix associated with traffic at each of the routers; and wherein said network availability is computed for a specified period of time and for end-to-end convergence for a flow from a source to a destination.

11. The apparatus of claim 10 wherein said route convergence measurements are associated with route computations at the routers and said traffic demand measurements comprise portions of a demand matrix associated with the routers.

12. The apparatus of claim 10 wherein the processor is further configured to identify an interest in network availability data for the network device.

13. The apparatus of claim 12 wherein said interest in network availability data comprises interest in said measurements for a specific resource.

14. The apparatus of claim 10 wherein the processor is further configured to transmit said route convergence measurements and said traffic demand measurements in an application layer protocol.

15. The apparatus of claim 10 wherein generating said traffic demand measurements comprises storing demands in a database comprising a plurality of demands computed for a specified time period and corresponding to cells of said demand matrix associated with traffic entering the network at the router, wherein demands corresponding to cells of said demand matrix associated with traffic entering the network at other routers are computed and stored at said other routers.

16. Logic encoded on one or more non-transitory computer readable media for execution and when executed by a computer operable to:

generate route convergence measurements; and provide said route convergence measurements to a network device operable to collect a plurality of said route convergence measurements and traffic demand measurements from a plurality of routers on multiple paths in a network and compute network availability based on said measurements;

wherein said route convergence measurements are associated with route computations related to routing convergences at the routers and comprise measurement of convergence behavior of routing protocols at the routers for use in identifying convergence time for a router to adapt to a change in network topology, said traffic demand measurements comprise demands corresponding to cells of a demand matrix associated with traffic at each of the routers; and wherein said network availability is computed for a specified period of time and for end-to-end convergence for a flow from a source to a destination.

17. The logic of claim 16 further comprising logic for identifying an interest in network availability data from the network device for a specific resource.

18. The logic of claim 16 wherein said route convergence measurements are provided to an application programming interface.

19. The logic of claim 16 wherein said route convergence measurements are associated with route computations at the routers and said traffic demand measurements comprise portions of a demand matrix associated with the routers.

20. The logic of claim 16 wherein said route convergence measurements are received for a specified service.

* * * * *